United States Patent
Takeshima

(10) Patent No.: US 12,514,531 B2
(45) Date of Patent: Jan. 6, 2026

(54) STETHOSCOPE

(71) Applicant: Onkyo Corporation, Osaka (JP)

(72) Inventor: Yoshitada Takeshima, Osaka (JP)

(73) Assignee: Onkyo Corporation, Osaka (JP)

( * ) Notice: Subject to any disclaimer, the term of this patent is extended or adjusted under 35 U.S.C. 154(b) by 284 days.

(21) Appl. No.: 18/108,586

(22) Filed: Feb. 11, 2023

(65) Prior Publication Data
US 2023/0255586 A1    Aug. 17, 2023

(30) Foreign Application Priority Data
Feb. 16, 2022    (JP) .................................. 2022-021976

(51) Int. Cl.
*A61B 7/04*    (2006.01)
*H04R 1/04*    (2006.01)
*H04R 1/46*    (2006.01)

(52) U.S. Cl.
CPC .................. *A61B 7/04* (2013.01); *H04R 1/04* (2013.01); *H04R 1/46* (2013.01); *A61B 2560/0214* (2013.01)

(58) Field of Classification Search
CPC .. H04R 1/04; H04R 1/46; H04R 17/02; A61B 7/02; A61B 7/026; A61B 7/00; A61B 5/024; A61B 2560/0214; A61B 7/04
USPC .......................................................... 381/67
See application file for complete search history.

(56) References Cited

U.S. PATENT DOCUMENTS

| | | | |
|---|---|---|---|
| 4,867,268 A * | 9/1989 | Ulert ...................... | A61B 46/10 181/126 |
| 5,367,575 A * | 11/1994 | Dieken .................. | A61B 7/045 429/96 |
| 5,548,651 A * | 8/1996 | Long ........................ | A61B 7/04 D24/134 |
| 5,663,532 A * | 9/1997 | Dieken .................... | A61B 7/02 181/131 |
| 5,921,941 A * | 7/1999 | Longobardo ............ | A61B 7/02 600/528 |
| 5,931,792 A * | 8/1999 | Packard ................. | A61B 7/026 600/528 |
| 6,491,647 B1 * | 12/2002 | Bridger ................. | G01L 1/2231 128/900 |
| 6,852,084 B1 * | 2/2005 | Boesen .................... | A61B 7/04 600/528 |
| 2005/0043643 A1 * | 2/2005 | Priemer ................. | A61B 7/026 600/528 |
| 2005/0049501 A1 | 3/2005 | Conero | |

(Continued)

FOREIGN PATENT DOCUMENTS

JP    2003-508145 A    3/2003
JP    2004-242849 A    9/2004

(Continued)

OTHER PUBLICATIONS

Office Action in corresponding Japanese Patent Application No. 2022-021976 dated Oct. 7, 2025.

*Primary Examiner* — Fan S Tsang
*Assistant Examiner* — Sean M Rinehart
(74) *Attorney, Agent, or Firm* — Renner, Otto, Boisselle & Sklar, LLP

(57) ABSTRACT

A stethoscope including a contact surface which contacts to an auscultatory subject, and a movable part which makes the contact surface movable.

12 Claims, 16 Drawing Sheets

(56) References Cited

U.S. PATENT DOCUMENTS

| | | | |
|---|---|---|---|
| 2008/0039733 A1* | 2/2008 | Unver | A61B 7/04 600/300 |
| 2009/0232323 A1* | 9/2009 | Berk | A61B 7/026 381/67 |
| 2013/0150744 A1* | 6/2013 | Brattain | G16H 50/30 600/529 |
| 2018/0177432 A1* | 6/2018 | Au | A61B 5/7264 |
| 2023/0200664 A1* | 6/2023 | Peters | A61B 5/002 600/301 |
| 2024/0341716 A1* | 10/2024 | Lee | A61B 5/7267 |

FOREIGN PATENT DOCUMENTS

| | | |
|---|---|---|
| JP | 2014-045918 A | 3/2014 |
| KR | 2003-0080714 A | 10/2003 |

* cited by examiner

STETHOSCOPE

CROSS-REFERENCE TO RELATED APPLICATIONS

This application claims priority to Japanese Application No. 2022-021976, filed Feb. 16, 2022, the entire contents of which are incorporated herein by reference.

FIELD

The present disclosure relates to a stethoscope.

BACKGROUND

In stethoscopes, there is a so-called digital stethoscope which electronically collects a sound such as a heart sound and the like by a sensor such as a microphone and the like, amplifies the collected sound and lets a doctor or the like listen to the amplified sound (for example, see JP 2004-242849 A).

Including the above described digital stethoscope, since a subject body (an auscultatory subject) that the stethoscope is used on has a roughness, there is a problem that it is difficult for the user of the stethoscope to appropriately contact the stethoscope to the auscultatory subject.

SUMMARY OF THE DISCLOSURE

According to one aspect of the disclosure, there is provided a stethoscope comprising: a contact surface which contacts to an auscultatory subject; and a movable part which makes the contact surface movable.

Figure 11A:
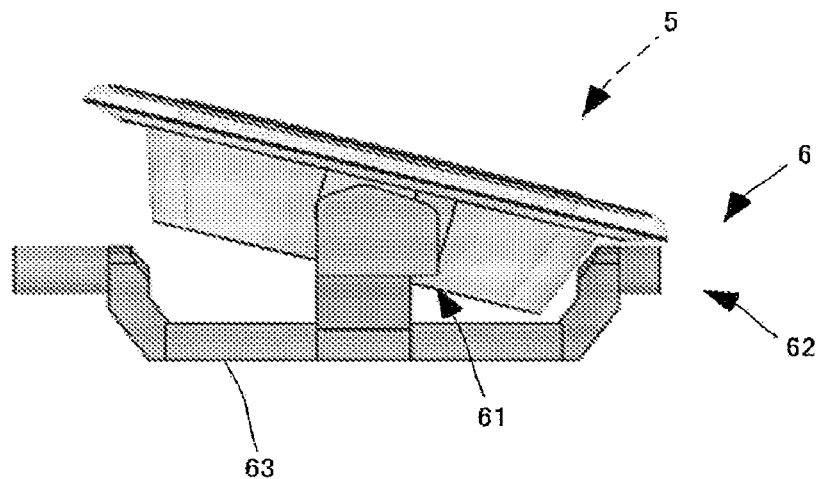
FIG. 11(a) is a diagram illustrating a rotating range of a sensor holder.
Figure 11B:
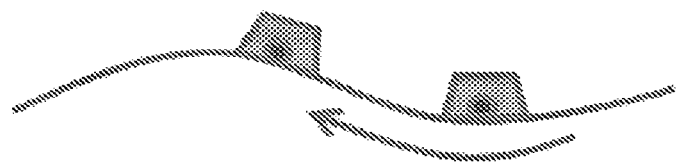
Figure 11C:
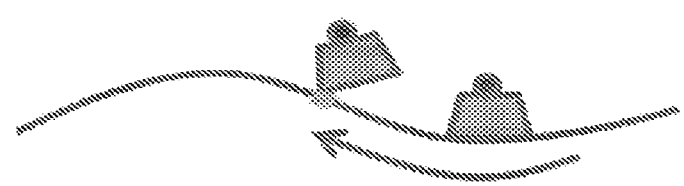

Each of FIGS. 11(b) and 11(c) is a diagram for describing a relation of a contact surface and a first shaft and a second shaft.

Figure 12:
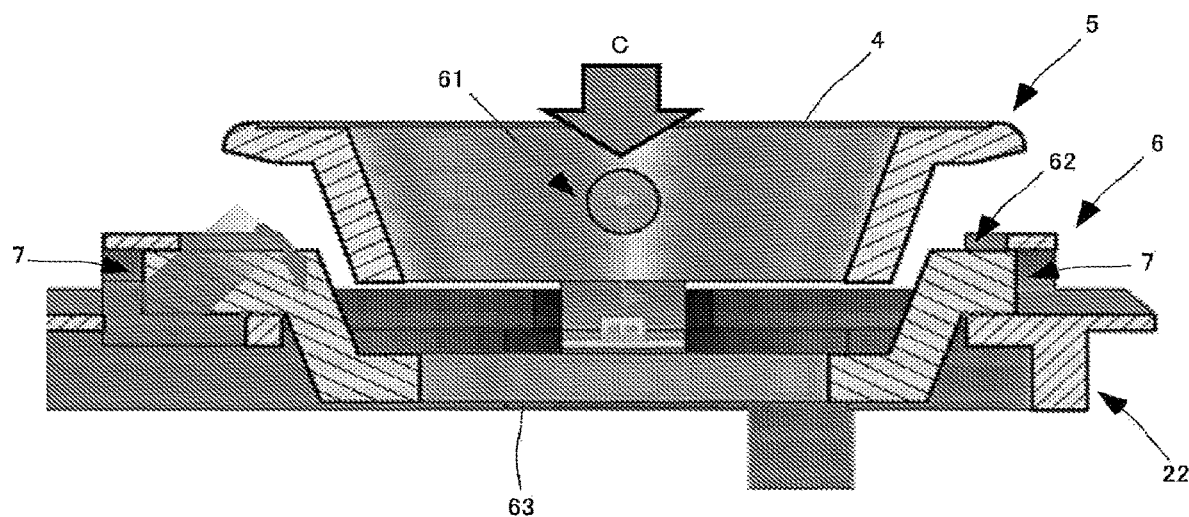

FIG. 12 is a diagram for describing an attachment of the gimbal mechanism to a main body enclosure.

Figure 13A:
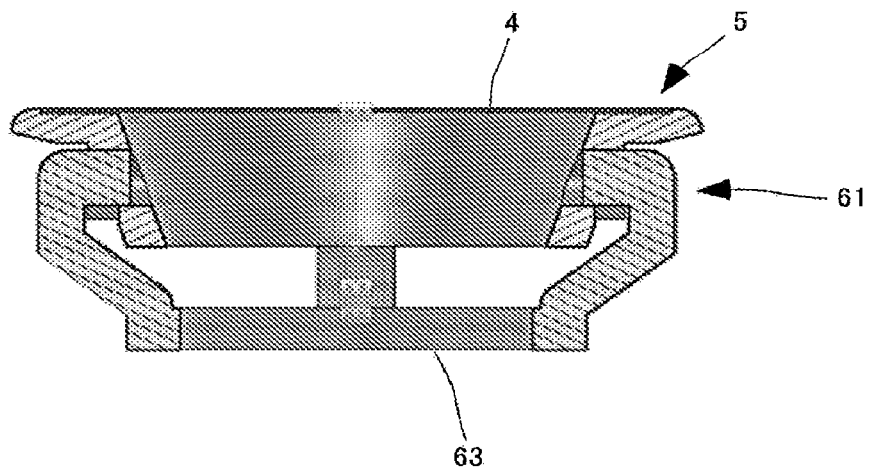
Figure 13B:
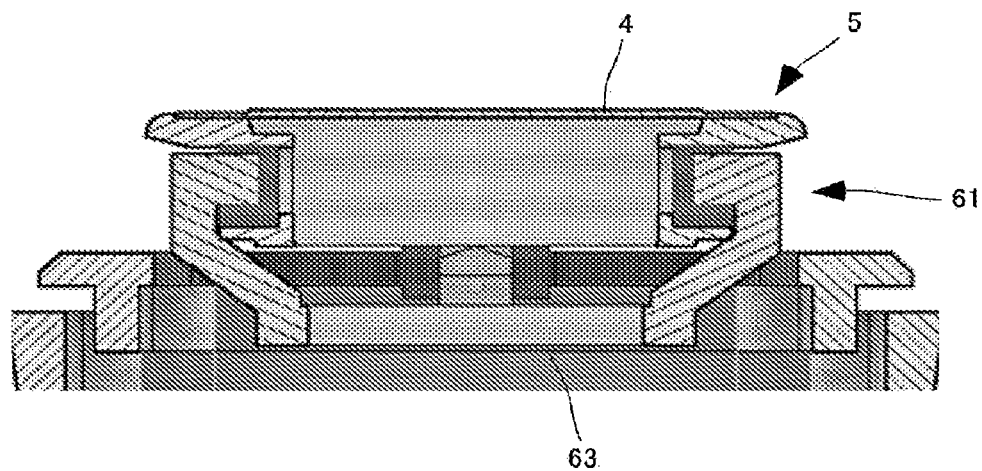

FIGS. 13(a) and 13(b) are sectional diagrams of a sensor holder vicinity.

Figure 14A:
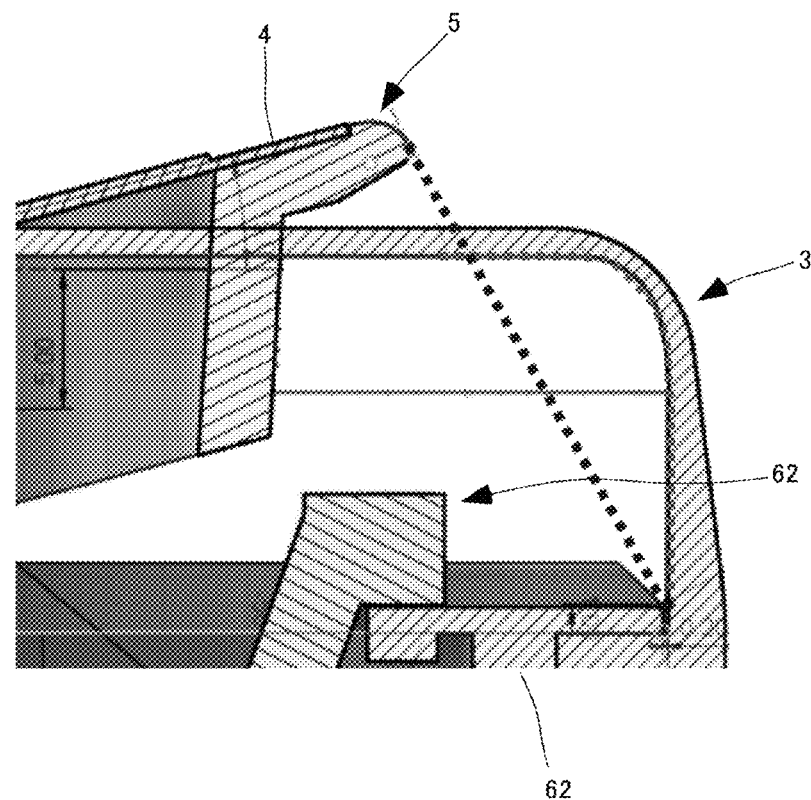
Figure 14B:
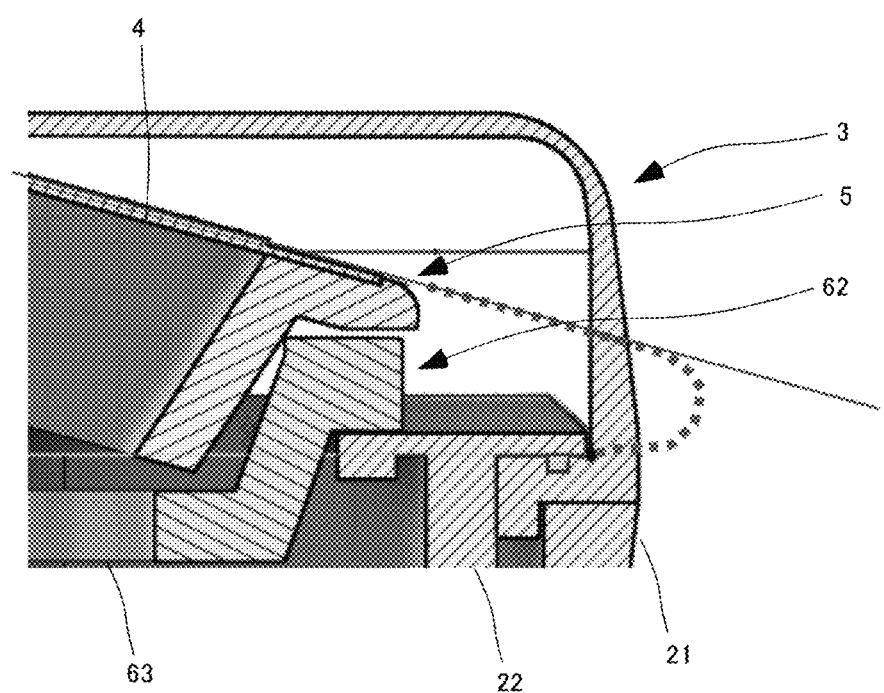

FIGS. 14(a) and 14(b) are sectional diagrams of a sensor cover vicinity.

Figure 15:
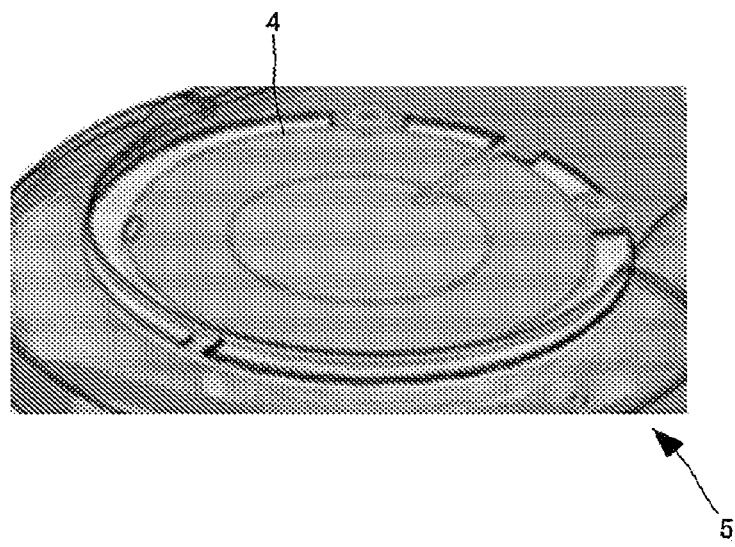

FIG. 15 is a diagram illustrating a sensor vicinity.

Figure 7:
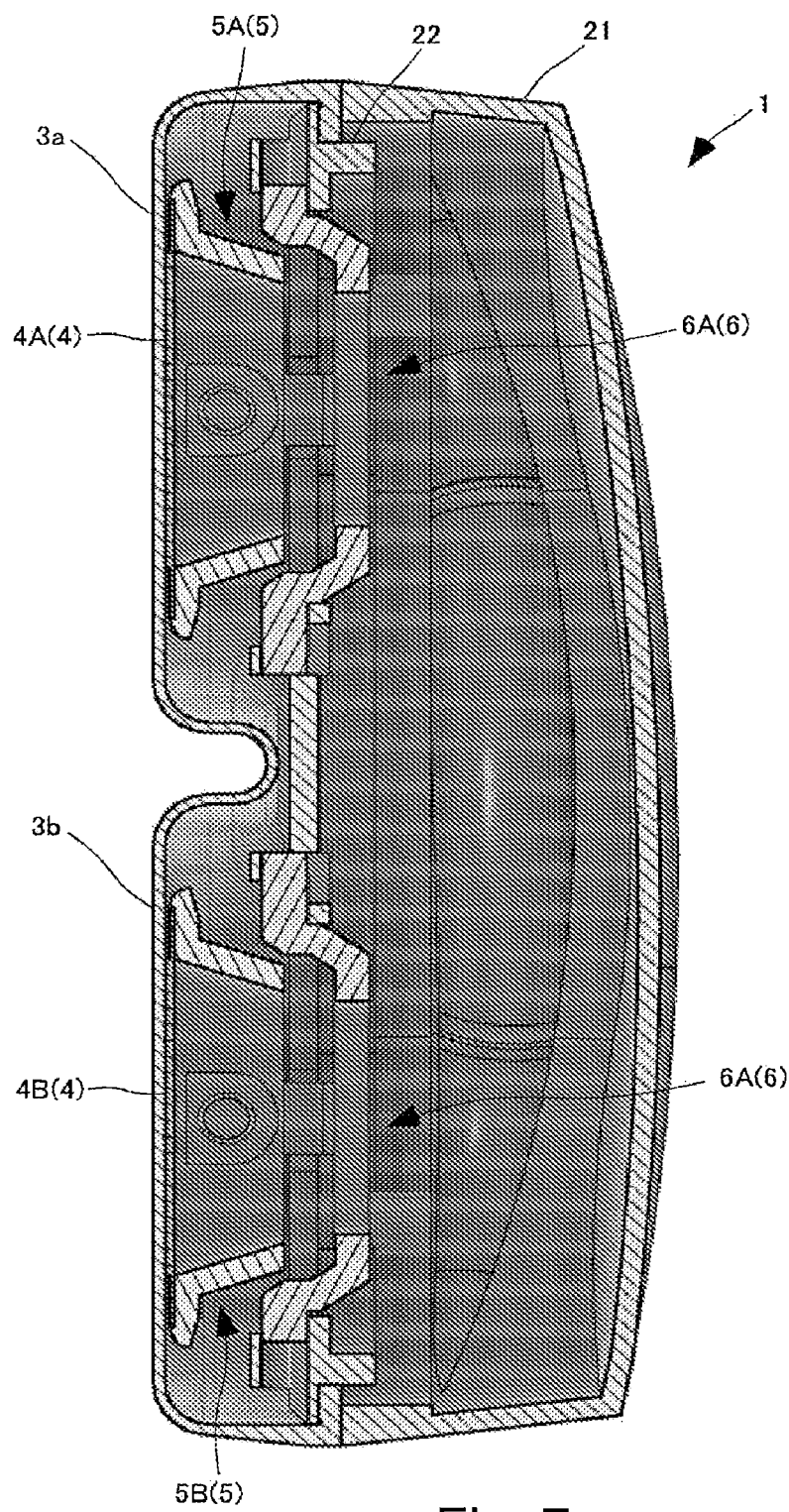
FIG. 7 is an A-A line sectional diagram in FIG. 4.
Figure 16:
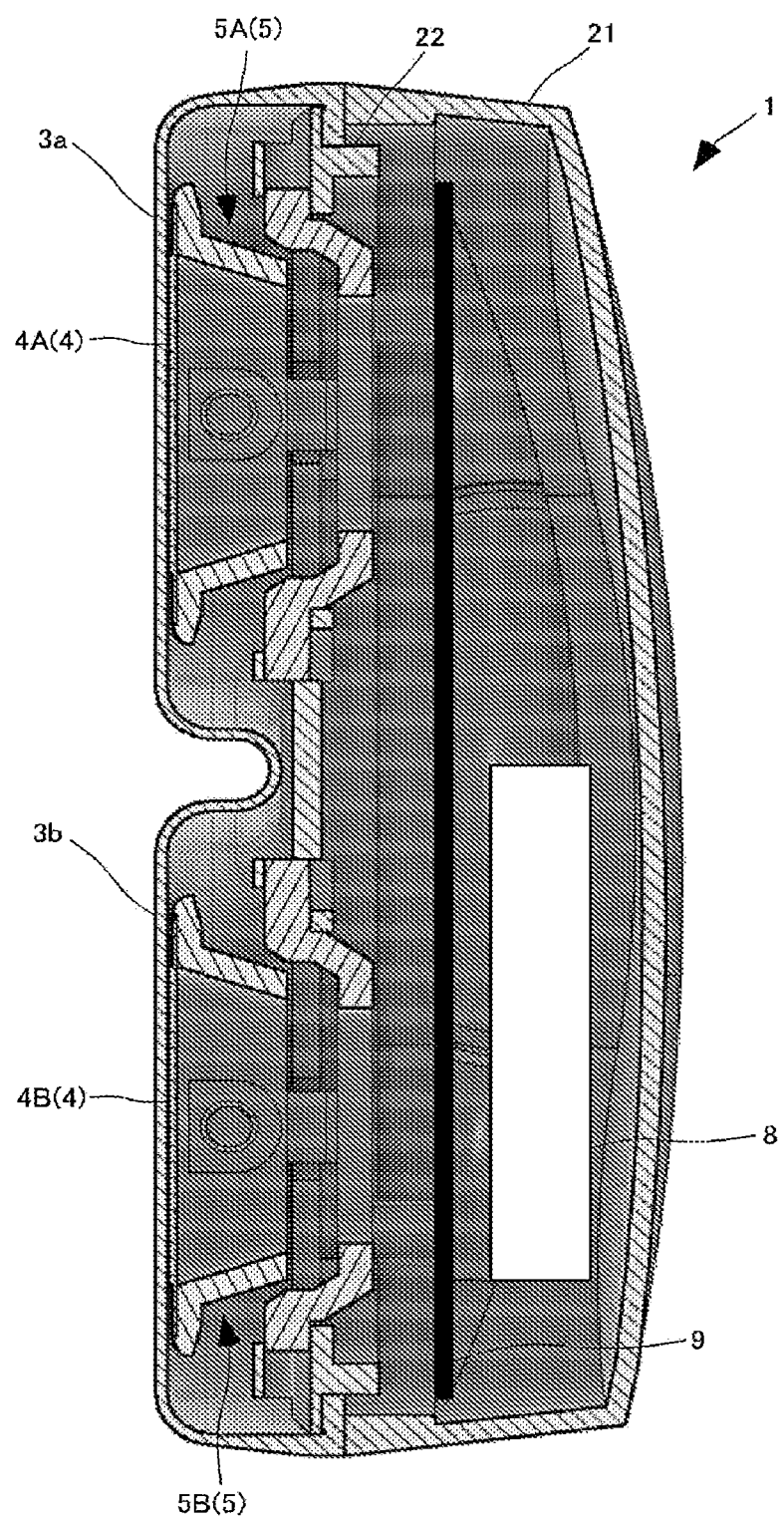

FIG. 16 is a diagram that a battery and a substrate are added to FIG. 7.

DETAILED DESCRIPTION OF THE PREFERRED EMBODIMENTS

An objective of the disclosure is to provide a means that a user of a stethoscope can appropriately contact the stethoscope to an auscultatory subject.

Figure 1:
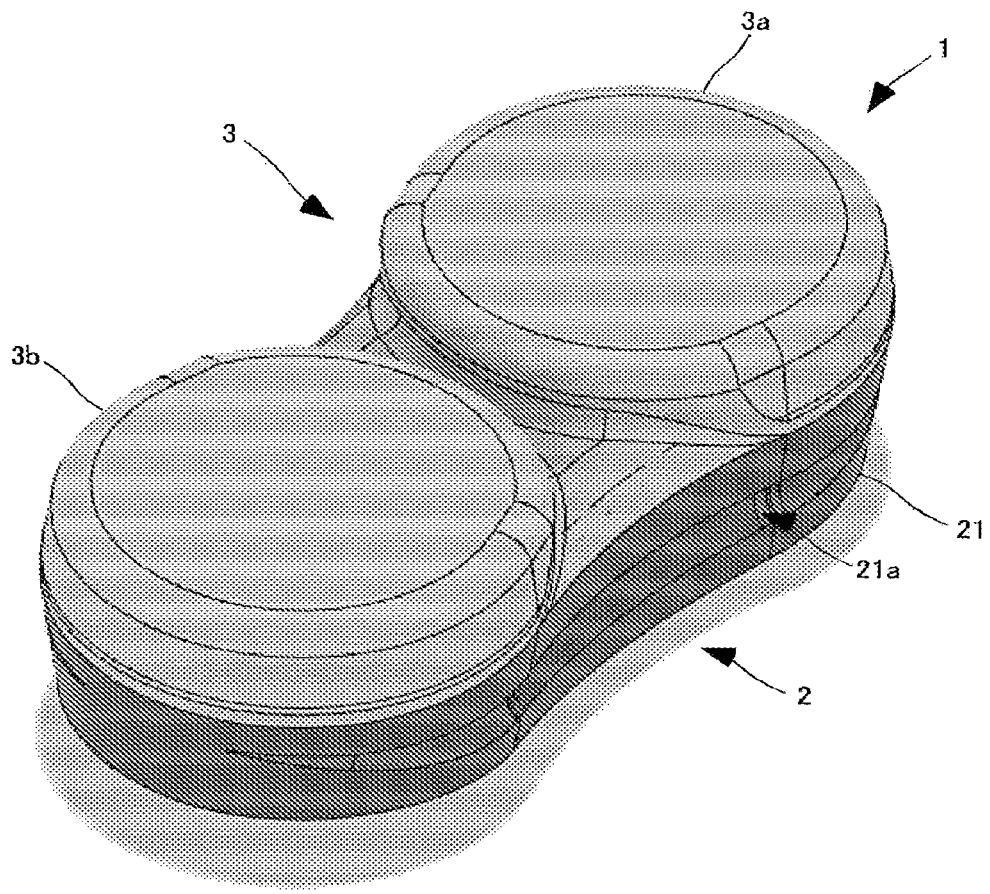
FIG. 1 is a perspective diagram illustrating a stethoscope according to an embodiment of the disclosure.
Figure 2:
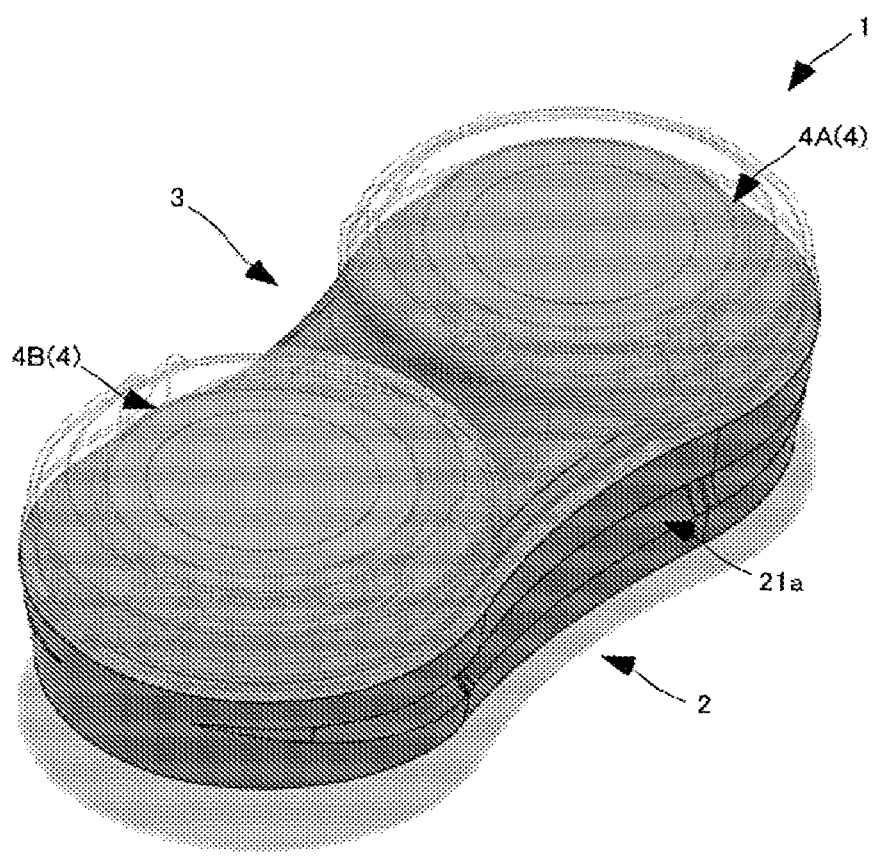
FIG. 2 is a perspective diagram illustrating the stethoscope according to the embodiment of the disclosure.
Figure 3:
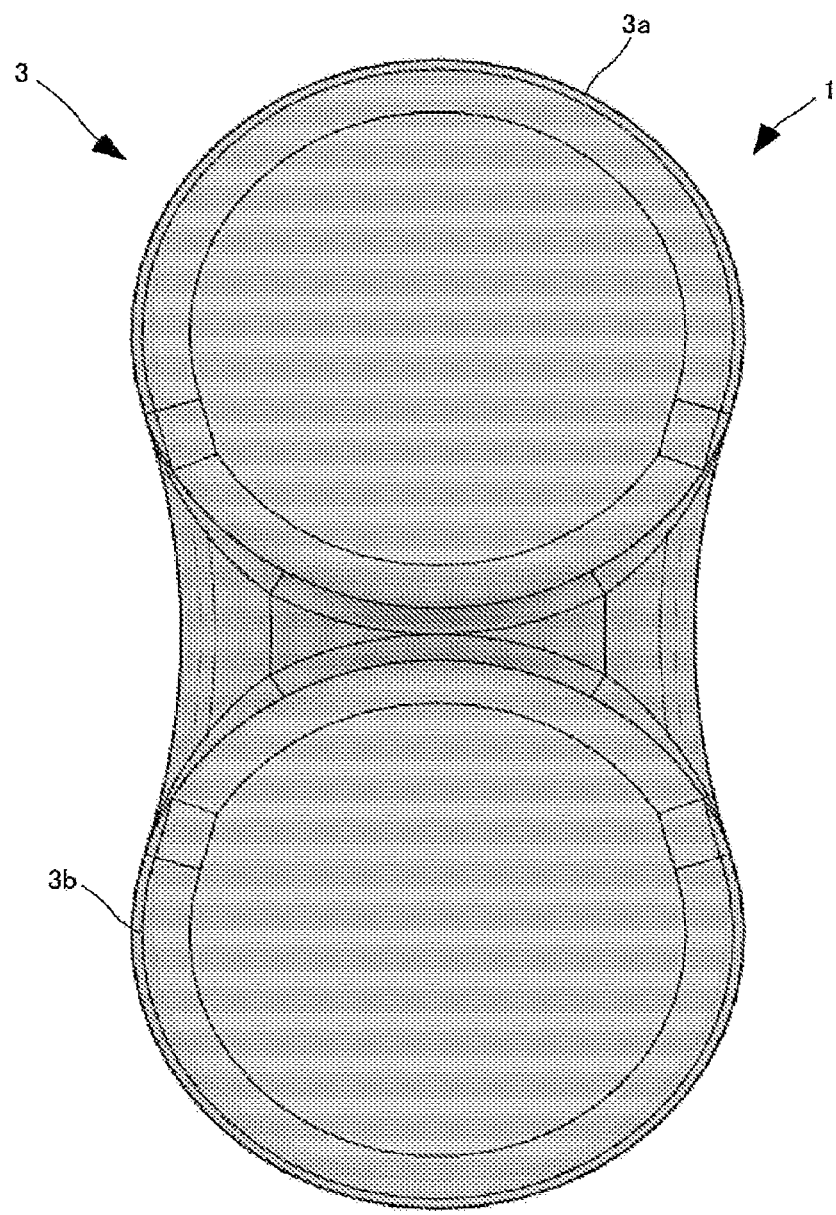
FIG. 3 is a rear diagram illustrating the stethoscope according to the embodiment of the disclosure.
Figure 4:
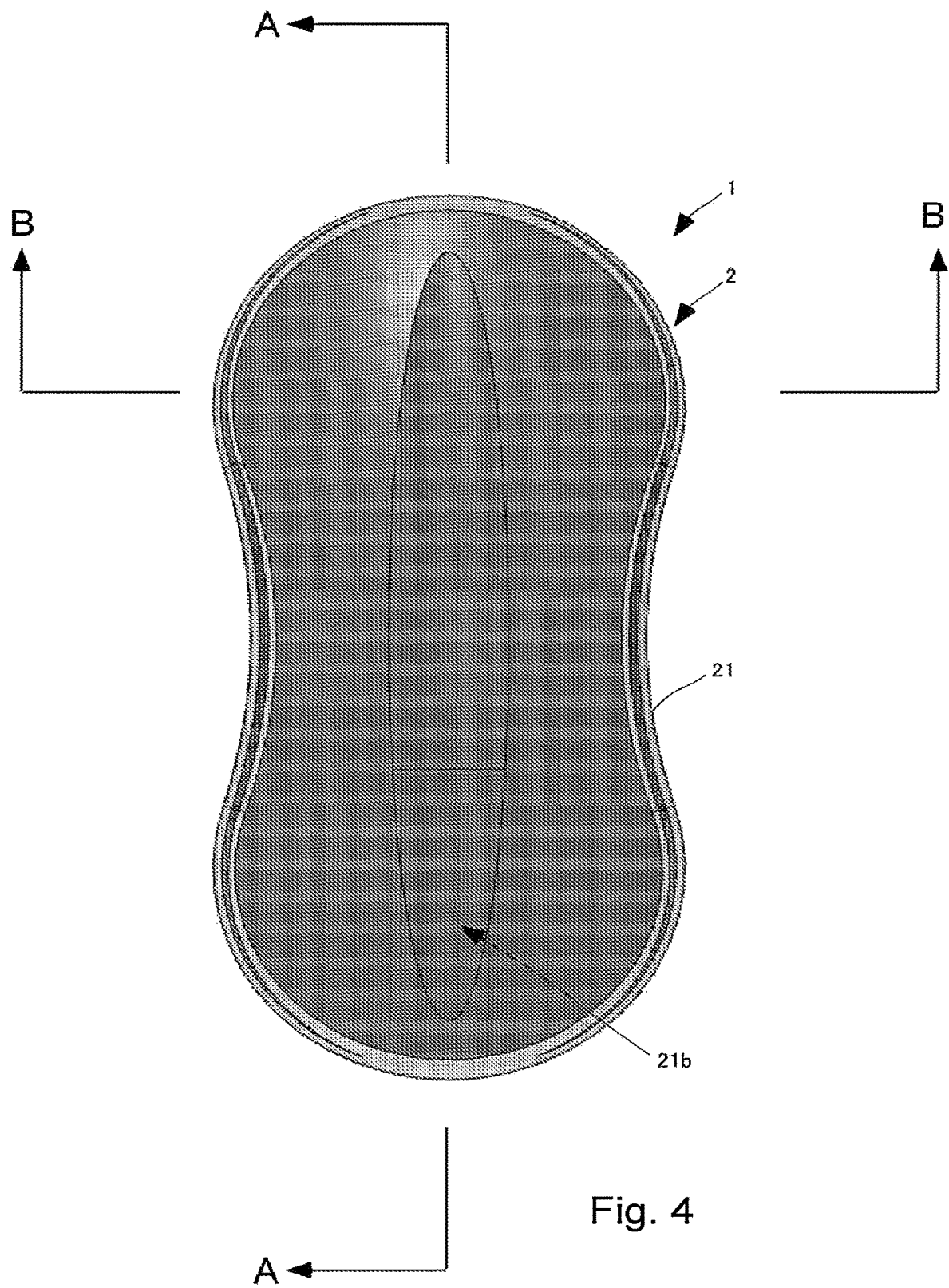
FIG. 4 is a front diagram illustrating the stethoscope according to the embodiment of the disclosure.
Figure 5:
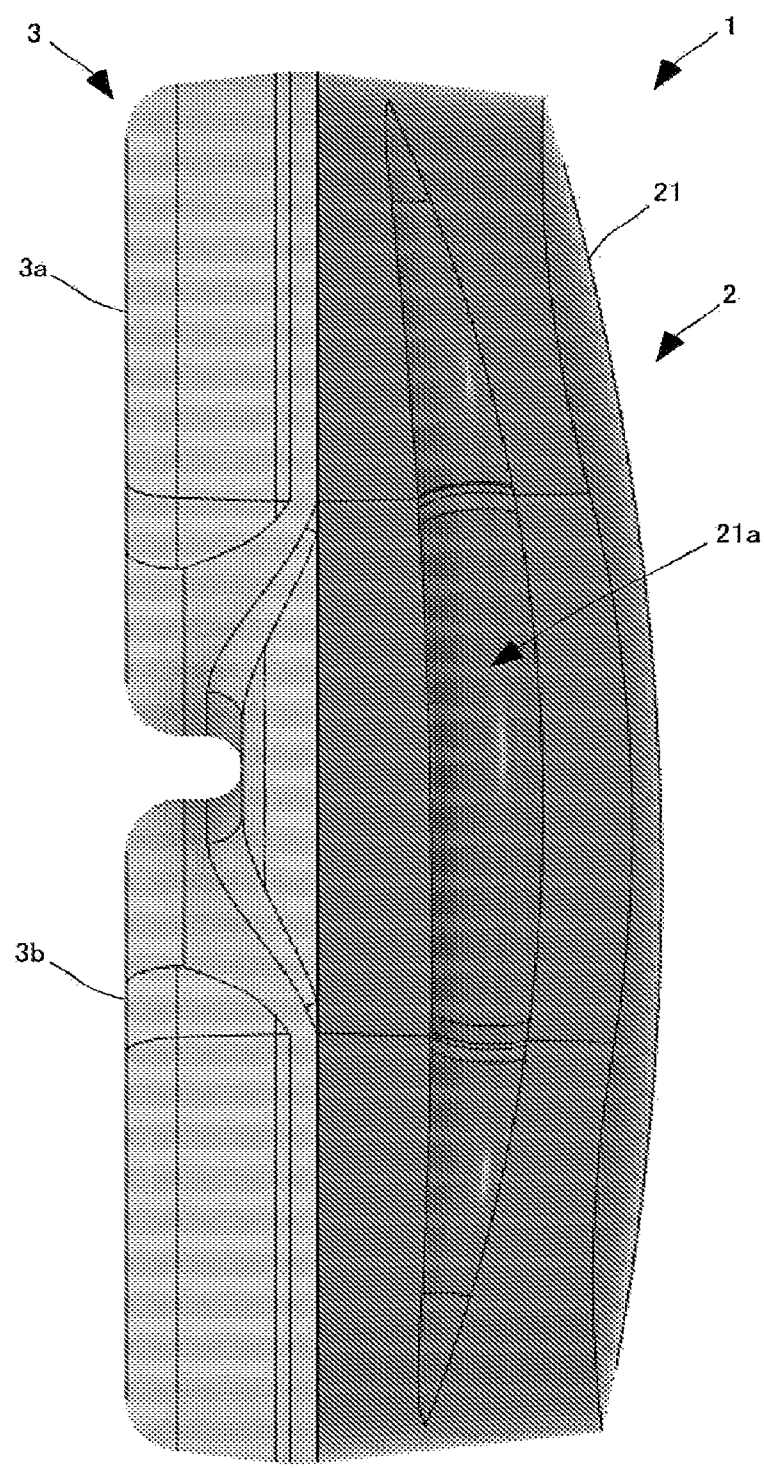
FIG. 5 is a left side diagram illustrating the stethoscope according to the embodiment of the disclosure.
Figure 6:
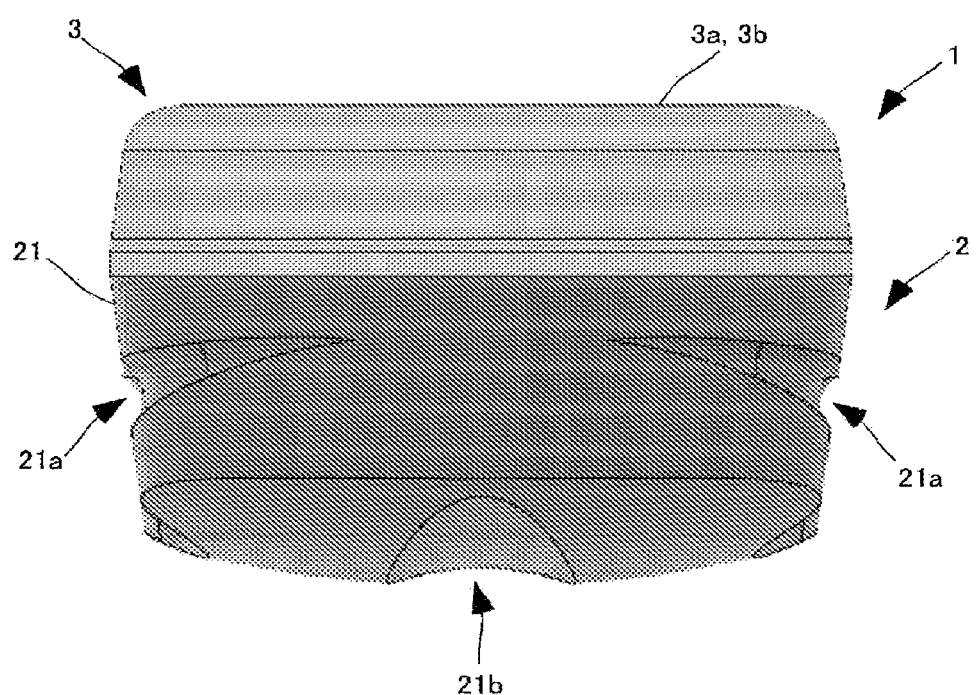
FIG. 6 is a top diagram illustrating the stethoscope according to the embodiment of the disclosure.
Figure 8:
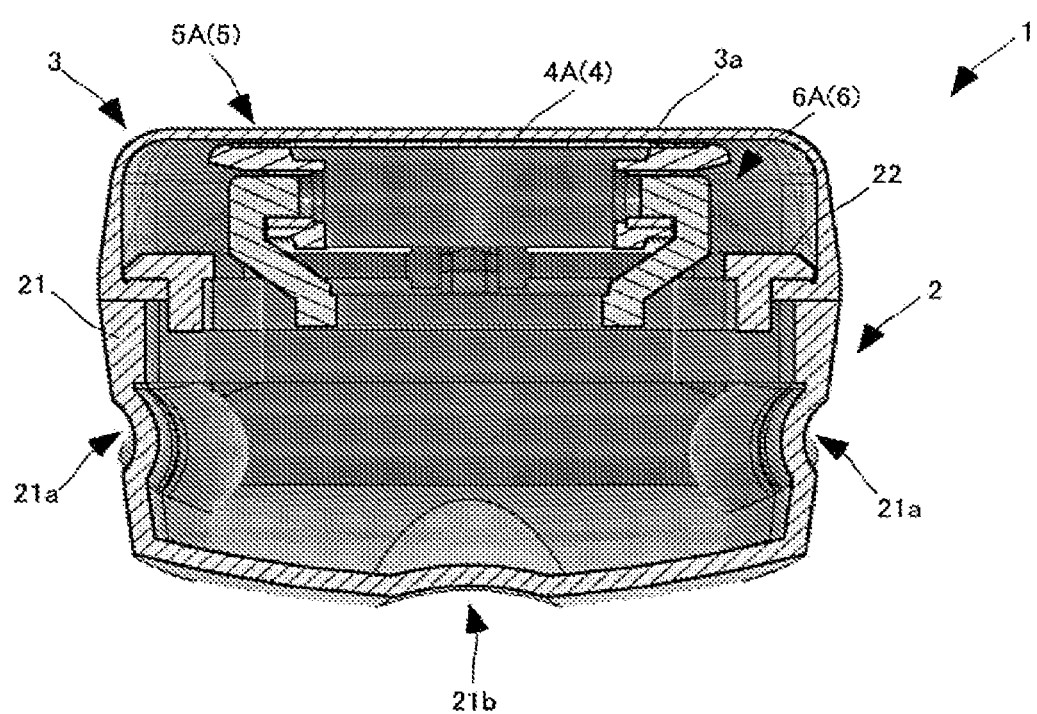
FIG. 8 is a B-B line sectional diagram in FIG. 4.

An embodiment of the disclosure will be described below. FIG. 1 is a perspective diagram illustrating a stethoscope 1 according to the embodiment of the disclosure. FIG. 2 is a perspective diagram illustrating the stethoscope 1 according to the embodiment of the disclosure. In FIG. 2, since a sensor cover 3 which will be described below is illustrated transparently, an inside sensor 4 which will be described below and the like are illustrated. FIG. 3 is a rear diagram illustrating the stethoscope 1 according to the embodiment of the disclosure. FIG. 4 is a front diagram illustrating the stethoscope 1 according to the embodiment of the disclosure. FIG. 5 is a left side diagram illustrating the stethoscope 1 according to the embodiment of the disclosure. FIG. 6 is a top diagram illustrating the stethoscope 1 according to the embodiment of the disclosure. FIG. 7 is an A-A line sectional diagram in FIG. 4. FIG. 8 is a B-B line sectional diagram in FIG. 4. The embodiment of the disclosure will be described below by setting contact surfaces 3a and 3b which contact an auscultatory subject side as a rear and an opposite side of the rear as a front.

Figure 9:
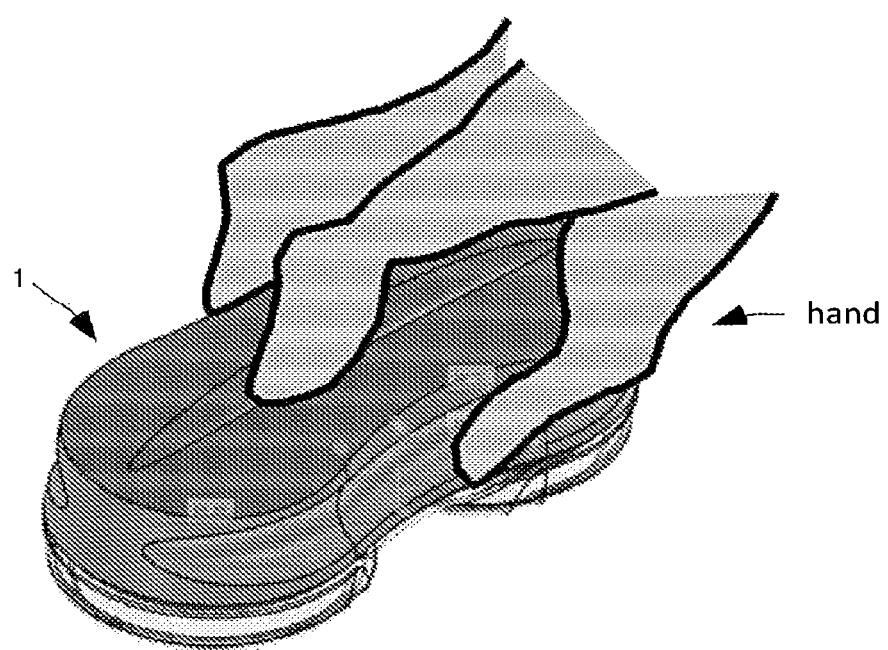
FIG. 9 is a diagram illustrating a use state of the stethoscope.

As illustrated in FIG. 9, a user of the stethoscope 1 uses the stethoscope 1 by grabbing the stethoscope 1 by his or her hand and contacting the stethoscope 1 to an auscultatory subject.

The stethoscope 1 is an almost sandglass shape when the stethoscope is seen from a front. The stethoscope 1 includes a main body enclosure 2 and a sensor cover 3. An enclosure of the stethoscope 1 is consisted of the main body 2 and the sensor cover 3. In FIG. 1 and the like, the main body enclosure 2 is a part which is illustrated by a dark gray. In FIG. 1 and the like, the sensor cover 3 is a part which is illustrated by a lighter gray than the main body enclosure 2.

The main body enclosure 2 houses a substrate, a battery and the like inside thereof. The main body enclosure 2 is consisted of a bottom enclosure 21 and a base frame 22. In both side surfaces of the bottom enclosure 21, ditches 21a which extend to a longitudinal direction are provided. A width of each of ditches 21a is widest in a center of the ditch 21a and becomes narrow toward a tip. Further, in a rear surface of the bottom enclosure 21 (an opposite side surface of the contact surfaces 3a and 3b, a ditch 21b which extends in a longitudinal direction is provided. A width of the ditch 21b is the widest in a center and becomes narrow toward a tip. It is considered that it is easy for the user to have the stethoscope 1 by his or her hand, and the ditches 21a and 21b are provided in the bottom enclosure 21 (the main body enclosure 2). Thus, it is easy for the user to have the stethoscope 1 by the ditches 21a and 21b.

In the bottom enclosure 21, a front surface (an opposite side surface against the contact surfaces 3a and 3b and a surface which contacts to a palm of the user) is a curved shape when a front surface is seen from a side. Curved rates of the front surface are different in one side and the other side in a longitudinal direction. Like this, by changing the curved rates, the user can grasp a front and a rear of the stethoscope 1. The user uses the stethoscope 1 by grabbing a side that the curved rate is large (a side that a curve is small).

The sensor cover 3 houses sensors 4 inside. In the present embodiment, the stethoscope 1 houses two (a plurality of) sensors 4A and 4B. Apart of the sensor cover 3 is the contact surfaces 3a and 3b which contact to an auscultatory subject. In the present embodiment, since the sensors 4 are two, two contact surfaces 3a and 3b are formed. Each of the contact surfaces 3a and 3b is an almost circular shape when the contact surfaces are seen from a rear. A material of the sensor cover 3 is a flexible material, for example, an elastomer, a silicon rubber or the like. Inside surfaces which correspond to the contact surfaces 3a and 3b of the sensor cover 3 cohere to the sensors 4A and 4B.

As described below, the sensors 4A and 4B can move. As described above, since the material of the sensor cover 3 is the flexible material (an elastic material), the contact surfaces 3a and 3b (the sensor cover 3) can follow a moving of the sensors 4A and 4B. Thus, the contact surfaces 3a and 3b also can follow the moving of the sensors 4A and 4B and move. A material of the sensor cover 3 may be a flexible material and a one to follow the moving of the sensors 4A and 4B.

In the sensor cover 3, a part which is except the contact surfaces 3a and 3b is recessed to a thickness direction. Conversely, a part which is other than a part which is recessed to the thickness direction of the sensor cover 3 is the contact surfaces 3a and 3b. Further, in the main body enclosure 2 and the sensor cover 3 (an enclosure), since an almost center part (a part which is between the contact surface 3a and the contact surface 3b) when seen from a rear is recessed to a direction which is orthogonal to a longitudinal direction (a direction that the contact surfaces 3a and 3b are in a line), the stethoscope 1 is an almost sandglass shape. Like this, since the part which is except the contact surfaces 3a and 3b is a shape which is recessed to the thickness direction in the sensor cover 3 and the almost center part in the longitudinal direction when seen from the rear is in a shape which is recessed to the direction which is orthogonal to the longitudinal direction in the main body enclosure 2 and the sensor cover 3 (the enclosure), an unnecessary part does not obstruct the user when the user puts the stethoscope 1 on the auscultatory subject.

As describe above, in the present embodiment, the stethoscope 1 includes the two sensors 4A and 4B. The sensor 4 is for collecting an auscultatory sound. For example, the sensor 4 is a piezoelectric sensor which is consisted of a piezoelectric element and the like. The sensor 4 is flat and an almost disk shape. Corresponding to this shape, the contact surfaces 3a and 3b of the sensor cover 3 is an almost circular shape when seen from a rear. The sensors 4 are arranged in the sensor holder 5.

The sensor holder 5 is an almost truncated cone shape. The sensors 4A and 4B are respectively arranged in the two sensor holders 5A and 5B. The sensor holder 5 is attached to the main body enclosure 2 (a base frame 22) by a gimbal mechanism 6 (a movable part). The sensor holder 5A is attached to the main body enclosure 2 (the base frame 22) by the gimbal mechanism 6A and the sensor holder 5B is attached to the main body enclosure 2 (the base frame 22) by the gimbal mechanism 6B.

Figure 10A:
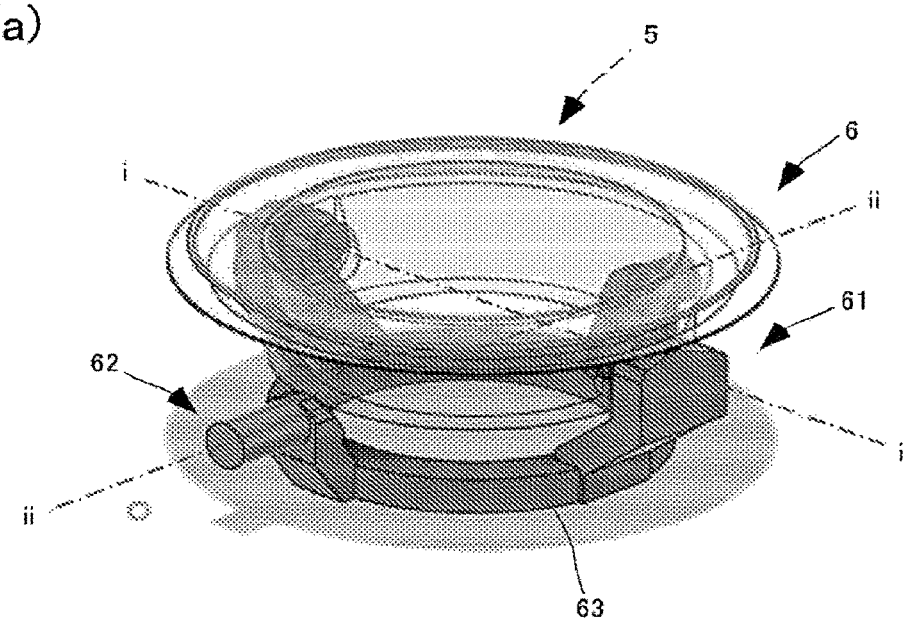
FIGS. 10(a), 10(b) and 10(c) are diagrams illustrating a gimbal mechanism.
Figure 10B:
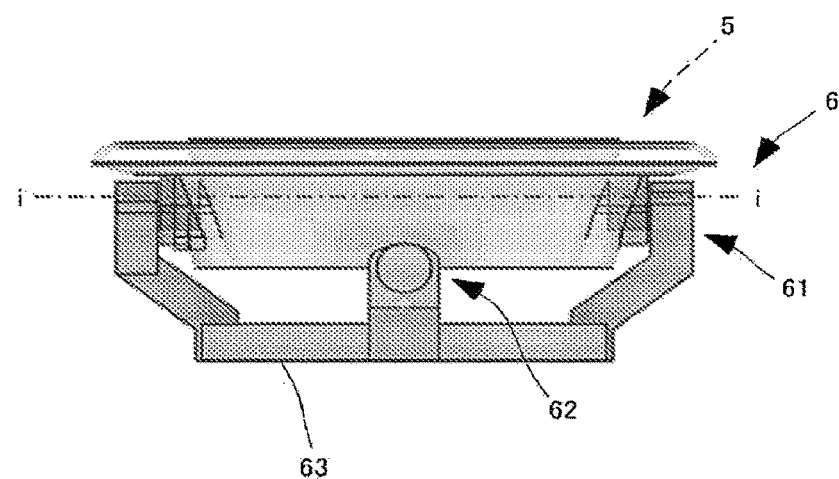
Figure 10C:
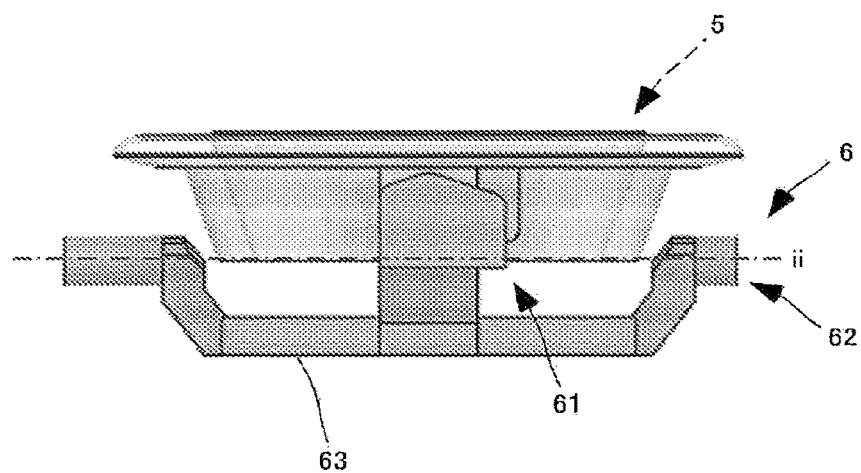

FIGS. 10(a)-10(c) are diagrams illustrating the gimbal mechanism 6. The gimbal mechanism 6 has a first shaft 61, a second shaft 62 and a base 63. The base 63 is an almost ring shape part which is a base of the gimbal mechanism 6. The first shaft 61 and the second shaft 62 are held by the base 63. The first shaft 61 and the second shaft 62 are orthogonal each other. The first shaft 61 is inserted to a bearing which is provided in the sensor holder 5. The sensor holder 5 is rotatably attached to the first shaft 61 (the gimbal mechanism 6) since the bearing is inserted to the first shaft 61. Thus, the sensor holder 5 can rotate centering around the first shaft 61 (a dashed line i-i). The second shaft 62 is rotatably attached to the main body enclosure 2 (the base frame 22). Thus, the gimbal mechanism 6 can rotate centering around the second shaft 62 (a dashed line ii-ii).

Like this, the sensor holder 5 can rotate centering around the first shaft 61 (the dashed line i-i) of the gimbal mechanism 6. Further, the gimbal mechanism 6 that the sensor holder 5 is attached to can rotate centering around the second shaft 62 (the dashed line ii-ii) of the gimbal mechanism 6. Therefore, the sensor holder 5 can rotate to two axes directions of the first shaft 61 (the dashed line i-i) and the second shaft 62 (the dashed line ii-ii) which is orthogonal to the first shaft 61. Similarly, the sensor 4 which is arranged in the sensor holder 5 can also rotate to the two axes directions of the first shaft 61 (the dashed line i-i) and the second shaft 62 (the dashed line ii-ii).

Similarly, the contact surfaces 3a and 3b which follow the moving of the sensors 4A and 4B can also rotate to the two axes directions of the first shaft 61 (the dashed line i-i) and the second shaft 62 (the dashed line ii-ii). Namely, the gimbal mechanisms 6A and 6B respectively make the contact surfaces 3a and 3B movable. Thus, since the contact surfaces 3a and 3b move when the user of the stethoscope 1 makes the contact surfaces 3a and 3b which contact to the auscultatory subject contact to the auscultatory subject, the user can contact the contact surfaces 3a and 3b with corresponding to a shape or the like of the auscultatory subject. Therefore, according to the present embodiment, the user can appropriately contact the stethoscope 1 to the auscultatory subject.

Since the two gimbal mechanisms 6A and 6B are respectively provided corresponding to the sensor holders 5A and 5B, the two gimbal mechanisms 6A and 6B respectively make the two contact surfaces 3a and 3b movable independently. Thus, like the present embodiment, even if the contact surfaces 3a and 3b are two (two or more), the user of the stethoscope 1 can contact the contact surfaces 3a and 3b corresponding to a shape or the like of the auscultatory subject. The two gimbal mechanisms 6A and 6B respectively make the two contact surfaces 3a and 3b rotatable to the two orthogonal axes direction (the first shaft 61 direction and the second shaft 62 direction).

Each of the contact surfaces 3a and 3b is a natural posture (a first posture) which is illustrated in FIG. 1 to FIG. 6 in a state that a load is not applied, namely, in no load. From this state, when the stethoscope 1 is contacted to the auscultatory subject, a load is applied to the contact surfaces 3a and 3b. When the load is applied to the contact surfaces 3a and 3b the contact surfaces 3a and 3b move by the gimbal mechanisms 6A and 6B. In other words, the gimbal mechanisms 6A and 6B make the contact surfaces 3a and 3b move corresponding to the load to the contact surfaces 3a and 3b. Further, in other words, the gimbal mechanisms 6A and 6B make the contact surfaces 3a and 3b tilt from the natural posture (the first posture) corresponding to the load to the contact surfaces 3a and 3b.

The first shaft 61 and the second shaft 62 of the gimbal mechanism 6 are positioned within a predetermined distance from the contact surfaces 3a and 3b. Herein, in FIGS. 11(b) and 11(c), the truncated cone shape sensor holder 5 and the first shaft 61 are schematically illustrated. As illustrated in FIG. 11(c), if the first shaft 61 is separated from the contact surfaces 3a and 3b side of the sensor holder 5, it is difficult that the contact surfaces 3a and 3b follow a roughness when the stethoscope 1 moves (slides) on the auscultatory subject which has the roughness. Meanwhile, as illustrated in FIG. 11(b), if the first shaft 61 is near the contact surfaces 3a and 3b side of the sensor holder 5, it is easy that the contact surfaces 3a and 3b follow the roughness when the stethoscope 1 moves (slides) on the auscultatory subject which has the roughness. However, as illustrated in FIG. 11(a), a rotating range (a rotating angle) centering around the first shaft 61 of the sensor holder 5 is dependent on a distance between the contact surfaces 3a and 3b side of the sensor holder 5 and the first shaft 61. When the distance is long, the rotating range is wide. When the distance is short, the rotating range is narrow. For this reason, considering the rotating range of the sensor holder 5, the distance between the contact surfaces 3a and 3b side and the first shaft 61 may be set. This may also be applied to the second shaft 62.

As illustrated in FIG. 12, when the second shaft 62 is inserted to one bearing 7 from an obliquely upward direction, the gimbal mechanism 6 is rotated to a clockwise direction, and the second shaft 62 is inserted to the other bearing 7, the gimbal mechanism 6 to which the sensor holder 5 is attached is attached to the main body enclosure 2 (the base frame 22). On the contrary, in the case where the gimbal mechanism 6 is removed from the main body enclosure 2 (the base frame 22), when the second shaft 62 is pushed from an aperture of the other bearing 7, the second shaft 62 is removed from the other bearing 7, the gimbal mechanism 6 is rotated to an anticlockwise direction, and the second shaft 62 is removed from one bearing 7, the gimbal mechanism 6 is removed from the main body enclosure 2 (the base frame 22). In a state that the gimbal mechanism 6 is attached to the main body enclosure 2 (the base frame 22), the second shaft 62 is hooked against the other bearing 7 with 0.5-1.0 mm, for example.

When the contact surfaces 3a and 3b contact to the auscultatory subject, a load is applied against the sensor holder 5 to a direction of an arrow C. As illustrated in FIG. 12, since a direction that a load is applied to the sensor holder 5 is not the same as a detachable direction to the sensor holder 5, a steady support can be provided in a receiving side. Therefore, a load can be steadily received in a direction that the load is received (arrow C direction), and it is easy to attach and remove the gimbal mechanism 6.

An elastic member which has an elasticity is provided between the sensor holder 5 and the first shaft 61. For example, as illustrated in FIG. 13(a), the sensor holder 5 itself may be the elastic member. Further, for example, as illustrated in FIG. 13(b), the elastic member may be provided near a contacted part of the sensor holder 5 and the first shaft 61. In FIG. 13(b), the elastic member is in an almost bracket shape. As described above, since the elastic member which has an elasticity is provided between the sensor holder 5 and the first shaft 61, an effect of a damping and a vibration proof can be obtained.

In the present embodiment, the gimbal mechanisms 6A and 6B are used as a movable part which makes the contact surfaces 3a and 3b movable. Not limited to this, for example, a mechanism by a spring may be used as the movable part which makes the contact surfaces 3a and 3b movable.

Each of FIG. 14(a) and FIG. 14(b) is a sectional diagram of a vicinity of the sensor cover 3. As illustrated in FIG. 14(a), since a sectional length of the sensor cover 3 is not a length to join an edge of the tilted sensor holder 5 and a holding part of the sensor cover 3 or less, the sensor cover 3 does not stretch even if the sensor holder 5 tilts. Further, as illustrated in FIG. 13(b), when the sensor holder 5 tilts outward, an inside structure object of the sensor cover 3 does not exceed an extended line of a top surface of sensor holder 5. Thus, even if the sensor holder 5 tilts, the contact surfaces 3a and 3b can be closely contacted and followed to the auscultatory subject (a body). Further, as illustrated in FIG. 14(b) since a lip is provided in an outermost circumference of the base frame 22 and the sensor cover 3 (an edge part of the sensor cover 3 which extends to an inside) is compressed and pinched by the lip and the bottom enclosure 21, an alcohol and other medicine and blood do not enter into an inside. As described above, although the sensor cover 3 (the contact surfaces 3a and 3b) follows a moving (a tilting) of the sensor holder 5, a state that the sensor cover 3 follows is not illustrated in FIG. 14.

FIG. 15 is a diagram of a vicinity of the sensor 4. The sensor 4 is attached to the sensor holder 5 by a screw (a fastening element) which is not shown. For example, when the sensor 4 is attached to the sensor holder 5 by a double-sided tape, a time deterioration, a variation due to individual differences, and a poor assemblability are considered. In the present embodiment, since the sensor 4 is attached to the sensor holder 5 by the screw (the fastening element), there are not these problems. Attaching the sensor 4 to the sensor holder 5 by the screw serves as positioning the sensor 4. A diaphragm may be provided between the sensor 4 and the sensor holder 5.

FIG. 16 is a diagram that a battery 8 and a substrate 9 are added to FIG. 7. The user holds either one side of a longitudinal direction of the stethoscope 1 by his or her hand and uses the stethoscope 1. The battery 8 is arranged such that the battery is shifted from the center of the main body enclosure 2 (enclosure) in the longitudinal direction. In this way, the heavy battery 8 is arranged where the user's hand is located, so that the center of gravity is concentrated at the hand, improving the ease of holding and operation.

The embodiment of the disclosure is described above, but the mode to which the disclosure is applicable is not limited to the above embodiment and can be suitably varied without departing from the scope of the disclosure as illustrated below.

In the above described embodiment, the sensors 4 are two, and each of the sensor holders 5 and the contact surfaces 3a and 3b which correspond to the sensors 4 are two. Not limited to this, a sensor(s) maybe one or three or more and each of a sensor holder(s) and a contact surface(s) which corresponds to the sensor(s) is/are the same as the number of the sensor(s).

The disclosure can be suitably employed in a stethoscope.

What is claimed is:

1. A digital stethoscope comprising:
   a plurality of piezoelectric sensors which are respectively for collecting an auscultatory sound and are the same in size;
   a plurality of sensor holders in which the plurality of piezoelectric sensors are respectively provided;
   a plurality of movable parts which respectively and independently make the sensor holders movable;
   an enclosure which houses the plurality of piezoelectric sensors, the plurality of sensor holders and the plurality of movable parts; and
   a plurality of contact surfaces which contact to an auscultatory subject, respectively move as to follow the plurality of piezoelectric sensors and are a part of a sensor cover,
   wherein each of the plurality of sensor holders is rotatably attached to a first shaft of each of the plurality of movable parts, a second shaft of each of the plurality of movable parts is rotatably attached to the enclosure, the first shaft is orthogonal to the second shaft, the plurality of sensor holders respectively rotate centering around the first shafts of the plurality of movable parts and the plurality of movable parts respectively rotate centering around the second shafts of the plurality of movable parts corresponding to the plurality of sensor holders via the plurality of piezoelectric sensors and the contact surfaces by contact of the contact surfaces to the auscultatory subject, and the plurality of the piezoelectric sensors and sensor holders are in a natural posture with no load and the plurality of piezoelectric sensors are in the same plane in the natural posture.

2. The digital stethoscope according to claim 1, wherein the first shafts and the second shafts are respectively positioned within a predetermined distance from the contact surface.

3. The digital stethoscope according to claim 1 further comprising:

an elastic member which has flexibility and is provided between each of the respective sensor holders and the first shafts.

4. The digital stethoscope according to claim 1, wherein each of the sensors is attached to the respective sensor holder by a fastening element.

5. The digital stethoscope according to claim 1, further comprising: one or more ditches which are provided to the enclosure.

6. The digital stethoscope according to claim 5, wherein the enclosure has a surface which is opposite to the contact surfaces and two side surfaces positioned on both sides of the contact surfaces, and the ditches are provided on the surface which is opposite to the contact surfaces and the two side surfaces.

7. The digital stethoscope according to claim 1, wherein in a surface of the enclosure, a part except the contact surfaces is recessed in a thickness direction of the enclosure.

8. The digital stethoscope according to claim 1, wherein the number of the plurality of contact surfaces is two and in the enclosure, a part between the two contact surfaces is recessed to a direction which is orthogonal to a direction that the two contact surfaces are in line.

9. The digital stethoscope according to claim 1, further comprising:

a battery;

wherein the enclosure houses the battery and the battery is arranged at a shifted position from a center of a longitudinal direction of the enclosure.

10. The digital stethoscope according to claim 1, wherein a surface of the enclosure which is opposite to the contact surfaces of the enclosure is a curved shape, and curved rates of either one side and the other side of a longitudinal direction of the surface which is opposite to the contact surfaces of the enclosure are different from each other.

11. The digital stethoscope according to claim 1, wherein the enclosure consists of a main body enclosure and a sensor cover which covers the plurality of piezoelectric sensors and an edge part of the sensor cover is pinched by the main body enclosure.

12. The digital stethoscope according to claim 1, wherein the enclosure consists of a main body enclosure and a sensor cover which covers the plurality of piezoelectric sensors.

* * * * *